(12) United States Patent
Brewer et al.

(10) Patent No.: US 6,336,163 B1
(45) Date of Patent: Jan. 1, 2002

(54) METHOD AND ARTICLE OF MANUFACTURE FOR INSERTING VOLUMES FOR IMPORT INTO A VIRTUAL TAPE SERVER

(75) Inventors: Vickie Lynn Brewer; James Arthur Fisher; Frank David Gallo; Timothy Clyde Sample, all of Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,251

(22) Filed: Jul. 30, 1999

(51) Int. Cl.[7] ........................... G06F 12/10; G06F 12/02
(52) U.S. Cl. ..................... 711/112; 711/111; 707/204
(58) Field of Search .................. 711/111, 112; 360/92, 360/128; 707/204

(56) References Cited

U.S. PATENT DOCUMENTS 5,193,184 A * 3/1993 Belsan et al. .................. 711/4
5,692,155 A * 11/1997 Iskiyan et al. .............. 711/162
5,835,954 A * 11/1998 Duyanovich et al. ....... 711/162

* cited by examiner

Primary Examiner—Reba I. Elmore
(74) Attorney, Agent, or Firm—James A. Pershon; Robert M. Sullivan

(57) ABSTRACT

In an automated retrieval library with virtual storage for identifying particular cartridges in the library to protect the data in the virtual volume from overwriting in import and export operations. A convenience input/output station is set to an import mode with export/import virtual tape servers. Possible import cartridges are categorized upon insertion to prevent their access by the host computer. Recovery from erroneous identification is provided.

16 Claims, 3 Drawing Sheets

METHOD AND ARTICLE OF MANUFACTURE FOR INSERTING VOLUMES FOR IMPORT INTO A VIRTUAL TAPE SERVER

DOCUMENTS INCORPORATED BY REFERENCE

Commonly assigned U.S. Pat. No. 5,546,557 is incorporated for its showing of a system for storing and managing plural logical volumes in each of several physical media volumes in an automated data storage library.

Commonly assigned U.S. Pat. No. 5,870,732 is incorporated for its showing of an automated virtual data storage and retrieval library.

Commonly assigned U.S. Pat. No. 5,805,864 is incorporated for its showing of a virtual tape storage system useful with the present invention.

BACKGROUND OF THE INVENTION

1. Field of the Invention

The present invention relates to digital data storage systems and more particularly the invention concerns a system for the identification of particular cartridges used for storing data in a virtual tape system in order to protect the data on the particular cartridge by preventing the overwriting of data and to recover from mistakenly identifying an import volume as a scratch volume.

2. Description of the Related Art

A critical aspect of digital data storage operations is the identification of a particular cartridge and its placement in a logical library to signify whether the cartridge can have its data overwritten or whether the data may exist only in that volume and must not be overwritten. There is a need to protect the data on a specific cartridge from being inadvertently overwritten if the data is unique and may not exist in any other manner. The protection of the data and the cartridge needs to be convenient for an operator that is inserting the cartridge into a library storage system.

Data storage libraries use portable media items such as magnetic tape or optical cartridges stored in a convenient form for easy handling in a storage system. In such libraries, one part of a read/write operation typically involves the retrieval of the appropriate cartridge. In a read operation, retrieval of a desired cartridge involves removing the cartridge from one of the many storage bins in the library and transferring the cartridge-to a drive. Like read operations, write operations may also be directed to a specific cartridge. However, some write operations are performed simply to store data in any available cartridge. These operations are called "scratch mounts", since the write procedure may be completed by mounting and then writing to any blank or "scratch" cartridge of the library. Scratch mounts may be contrasted, for example with write operations that serve to update or supplement data previously written to a cartridge.

Today, a library data server contains one or more servers handling the optical or magnetic media onto which the data is stored. Magnetic tape storage is presently preferable to optical storage and therefore this invention will be described using a magnetic tape cartridge library system. It should be understood that this invention is equally adaptable to both.

A library data server generally includes one or more tape servers into which a plurality of tape cartridges are stored to access the data stored on the individual tape cartridge. The library data server automates the retrieval, storage and control of tape cartridges and the data on the cartridges. The library data server includes an operator panel, a tape subsystem with drives, a library manager, cartridge storage cells, a cartridge accessor and an input/output station. A virtual tape server can be included and includes additional cartridge storage and a controller.

The logical library to which a cartridge is associated, is determined using volser range tables. The volser range tables define which range volsers are to be associated with a logical library. When a cartridge is inserted into the library, the volser ranges identify which logical library to which the cartridge is to be assigned. The cartridge can be assigned to a standard logical type library or one of the virtual tape server VTS logical libraries. When the cartridge is assigned to a logical library it is put into an insert category. The host that owns the new volume changes the volumes category to a "scratch" volume. Subsequently, any data on the volume can be overwritten. With the addition of export/import capabilities, cartridges can be used as exported stack volumes containing exported logical volumes. With this addition to the virtual tape servers (VTS) a cartridge could be assigned to a non-VTS logical library, a VTS logical library, or be identified as an exported stacked volume for use in an import operation. The data on the exported stack volume may only exist on that volume and must not be overwritten.

A number of different approaches may be used to satisfy "scratch mounts". One simple approach is for a human operator or robot to select the cartridge, manually transfer the cartridge to the drive, and then direct the drive to mount the cartridge. The problem is that the volume may be improperly selected and may be assigned to a location where the information may be overwritten. With the addition of the particular new export/import conveniences to a VTS, a need is created to protect the data of the exported stacked volume from being inadvertently overwritten. This protection needs to be convenient for an operator that is inserting the cartridges into the library.

SUMMARY OF THE INVENTION

Broadly, the present invention concerns an article of manufacture and a system and method for controlling a cartridge storage system by providing a protection under the convenience of an operator that is inserting the cartridges into a library. The invention may be implemented by providing a convenience input/output station that can be set to one of two modes based on the capabilities of the virtual tape servers in the library. If none of the virtual tape servers in the library are export/import capable, then the convenience input/output station is set to the insert mode. This operates the station in the same manner as in the prior art. However, if one or more of the virtual tape servers in the library are export/import capable, the convenience input/output station is set to the import mode. The import mode causes possible import cartridges to be set to an unassigned category when they are inserted. Volumes in this category cannot be accessed by any host or virtual tape server. Means are provided for the operator to identify which of the unassigned volumes are export stacked volumes, which volumes should be evaluated as insert volumes, and which volumes need to be ejected. Further means are provided for the operator to eject a volume identified as an insert volume. This provides the operator with a means to recover an exported stacked volume that was mistakenly identified as an insert volume.

The convenience input/output station can be in one of two modes, import or non-import depending on the capabilities of the virtual tape servers in the library and the configuration of the library.

The invention provides a number of distinct advantages. The present invention provides a method and article of manufacture to prevent exported logical volume data from being overwritten especially when the volume contains information that is unique and available in no other format. The invention further provides means by which an operator can recover from mistakes where an import volume is identified as a scratch volume which is capable of accepting new data.

An object of the present invention, therefore, is to provide a tape library data server that includes an article of manufacture and a method of preventing exported logical volume data from being overwritten.

Another object of the present invention is to provide a means and a process to recover from errors where an import volume is identified as a scratch volume.

Still another object of the invention is to provide a process of moving volumes in the import category to the appropriate insert category based on the volser ranges and permitting the ejection of the volume if necessary.

Yet another object of the invention is to provide a tape library data server which includes virtual tape servers that are capable of handling export/import volumes.

The foregoing, and other objects, features and advantages of the invention will become more apparent to those skilled in the art after considering the following detailed description in connection with the accompanying drawings in which reference numerals designate like parts throughout.

DETAILED DESCRIPTION OF THE PREFERRED EMBODIMENTS

Figure 1:
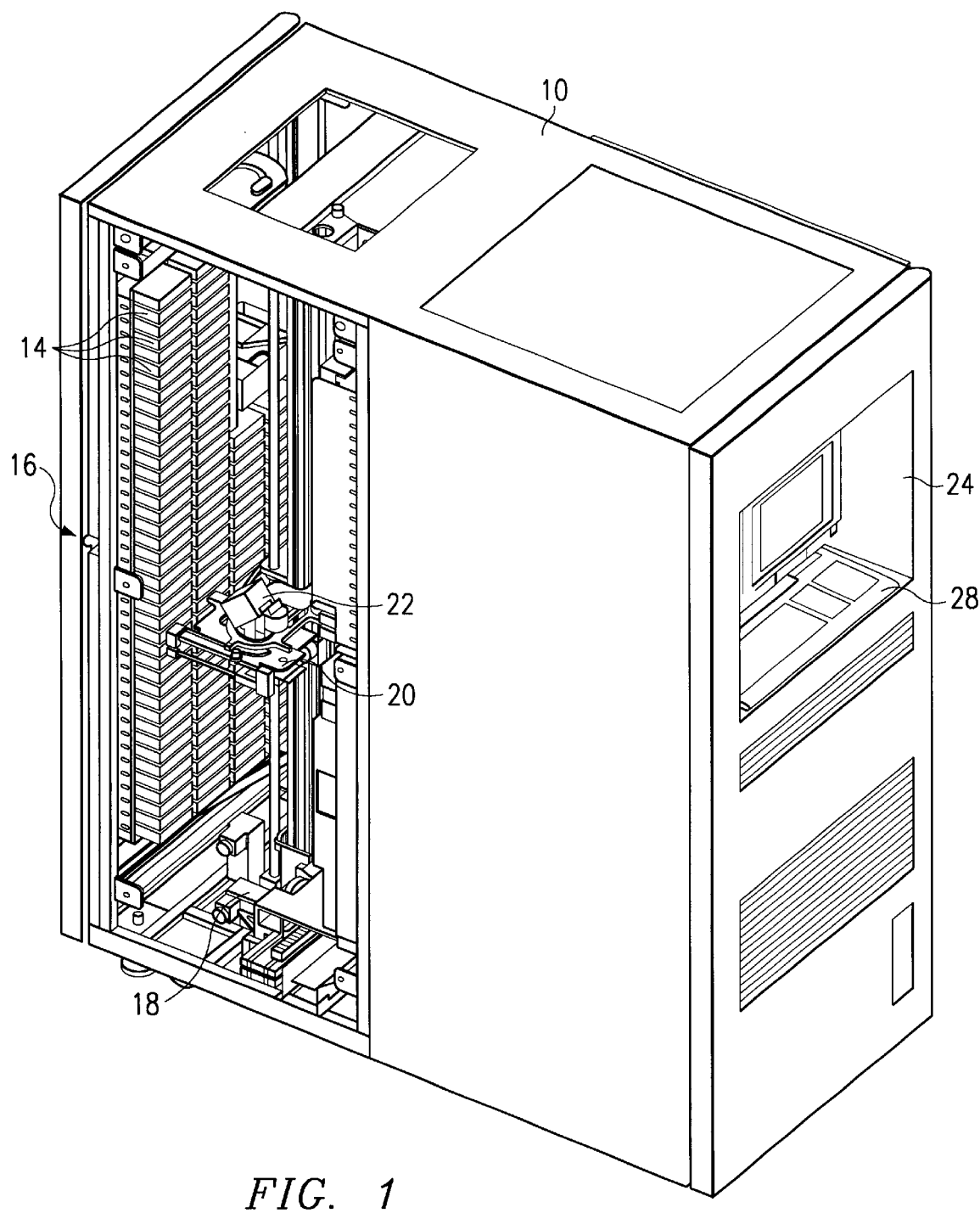
FIG. 1 is an isometric view of an automated virtual storage and retrieval library of the present invention.
Figure 2:
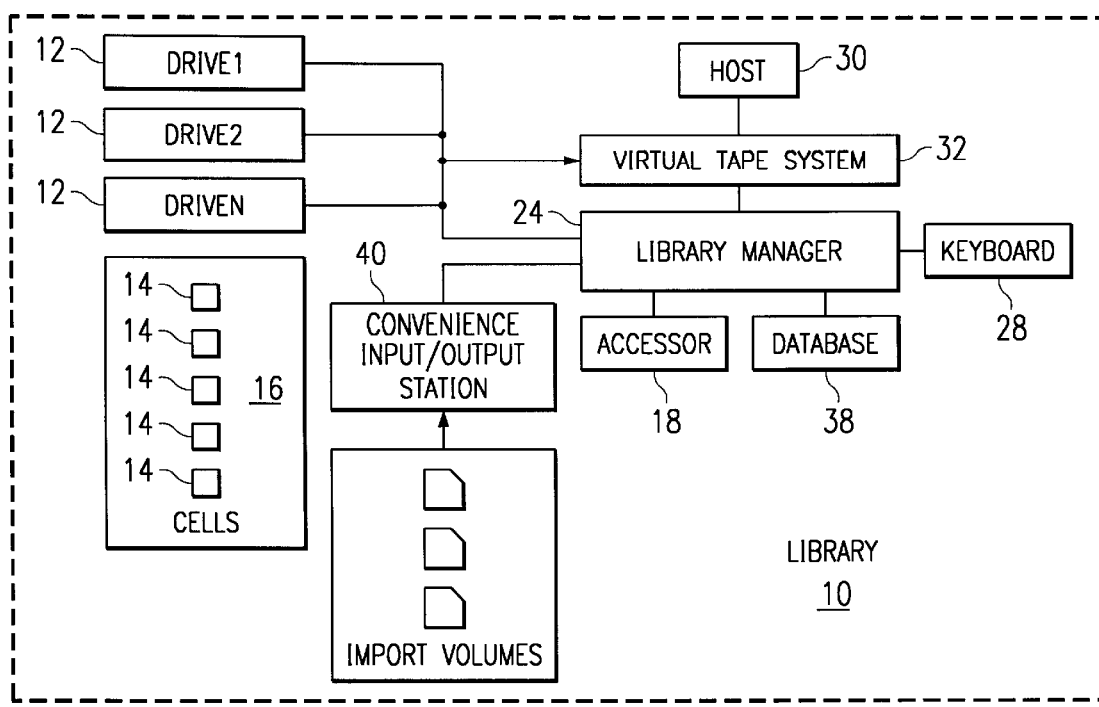
FIG. 2 is a block diagram of the hardware components and interconnections of an illustrative implementation of the invention.

One aspect of the invention concerns a virtual cartridge data storage library that includes a method and apparatus for differentiating between tape volumes inserted into a virtual tape storage library such that stacked volumes with active data which need to be imported into the library are distinguished from scratch stacked volumes and scratch native volumes which can be overwritten in the library. The present invention sets the convenience input/output station to one of two modes, import mode or non-import mode. When the input/output station is in an import mode, the present invention places inserted, potential import volumes into a special unassigned category. When the input/output station is in a non-import mode, the present invention places all inserted physical volumes into a normal insert category. The present invention also includes means for the selection of the mode of the convenience input/output station. The present invention also includes means for recovering from mistakenly identifying an import volume as a scratch volume. FIGS. 1 and 2 depict the various hardware components and interconnection of one example of a system encompassing the present invention.

FIG. 1 is an isometric view and FIG. 2 is a block diagram of an automated virtual information storage and retrieval library 10 for storing and accessing data storage media capable of having plural logical data volumes thereon. The library 10 includes one or more data drive units 12 with media cartridges 14 stored in cells 16, an accessor 18, and a library manager 24. The accessor 18 transports a selected cartridge 14 between a storage cell 16 and one drive 12. The accessor 18 includes a cartridge gripper 20 and a bar code scanner 22, to "read" identifying cartridge labels. The drives 12 can be optical disk drives or magnetic tape drives and the cartridges can contain optical or magnetic media, respectively, or any other removal media and associated drives.

Referring especially to FIG. 2, the library manager 24, which includes at least one computing processor, is interconnected with, and interacts with, the drives 12 (through their associated controllers), and controls the actions of the convenience input/output station 40 and the accessor 18. The library manager 24 is also provided with a keyboard 28 and is interconnected through a virtual tape system (VTS) 32 to one or more host processors 30. The library manager 24 is provided with a database 38 which includes storage, typically one or more hard disk drives for tables and programs to operate and control the library 10.

In particular, FIG. 2 depicts a data storage system including the host systems 30 connected to the virtual tape system 32. The host system 30 may be embodied by a number of diverse systems such as a library controller, main frame computer, personal computer, and the like. The host 30 issues commands in an appropriate format to direct the performance of read and/or write operations to the virtual tape system 32. The cartridges stored in the VTS 32 do not actually exist in any physical embodiment and therefore are called "virtual cartridges". The virtual tape server 32 and its cartridge storage library is likewise sometimes called a "virtual library".

The library 10 may incorporate hardware components of existing virtual cartridge libraries, a number of which are well known in the art. One example is disclosed in U.S. Pat. No. 4,467,421, entitled "Virtual Storage System and Methods", issued Aug. 21, 1984. The '421 patent is incorporated by reference in its entirety. Further detail of the structure and operation of the VTS 32 to emulate a cartridge data storage library and communicating with the host 30 while actually storing data on the DASD should be apparent to those of ordinary skill in the art having the benefits of this disclosure and known virtual library systems such as described in the '421 patent.

Continuing with FIG. 2, the tape library 10 includes the library manager 24 which includes at least one computer processor and is interconnected with and interacts with the actions of the set of drives 12 through their associated controllers and the accessor 18. The library manager 24 is also provided with a keyboard 28 and its associated display and is interconnected through the VTS 32 to the host processors 30. A plurality of media cartridges 14 are stored in the cells 16 in the tape library 10 and are controlled by the drives 12 through the VTS 32, the convenience input/output station 40 and the accessor 18 through the library manager 24. The data contained in the cartridges 14 is written on and read from cartridges selected by the VTS 32. The cartridges 14 can contain optical or magnetic media, respectively, or any other removable media and associated drives 12. The cartridges 14 preferably utilize the IBM 3490 and 3590 tape technology for higher utilization now enabled by current tape controller concepts.

The VTS 32 combines the random access and high performance characteristics of disk storage with upward hierarchical storage management and virtual tape drives to provide significant reductions in the number of physical cartridges, tape drives and automated libraries.

The library manager 24 interacts with each server including at least one virtual tape server VTS 32. The keyboard 28 and the data base 38 is associated with the library manager 24. The cartridge accessor 18 moves the cartridge 14 between the storage cells 16, drives 12 and the convenience input/output station 40. The convenience input/output station 40 can add or remove cartridges from the tape library 10 without interrupting the normal operation of the library.

The library manager 24 creates and maintains the data base 38 that contains the configuration of the library, the physical location information for all the elements of the library serviced by the accessor 18, the inventory of the physical cartridge volumes, the logical volumes managed by VTS 32, information about the use of the volumes and their current states. As operations progress through the library, the database 38 is dynamically updated to reflect the current status of the library. The host 30 may access the information in the database 38 through the library manager 24. The library manager 24 also controls the loading and unloading of cartridges on the input/output station 40.

The virtual tape server 32 emulates multiple tape drives and eliminates the need for host software support of a new type of tape drive. Data is stored in a disk drive located within the VTS 32. Data is written and read by the VTS 32 and stored in the disk drives just as if the data is stored on tape cartridges. A controller in the VTS 32 translates all tape read and write commands to read and write data records to its internal disk drive. Volumes of data residing on the disks are called virtual volumes. All data interactions with the host 30 are through virtual volumes and there is no direct access to the data on a physical cartridge or drive. At a later time virtual volumes are copied to physical stacked volumes. Placing the virtual volume data in the disk drive permits fast access to the data. The VTS 32 manages the contents of the data on the disk drive.

Fast response is attained because the VTS 32 signals that the connection is complete immediately when the volume is accessed. No physical movement of any cartridge is involved.

Figure 3:
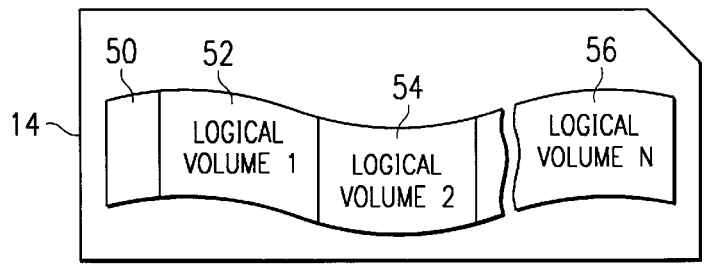
FIG. 3 is a generalized diagram of logical volumes stored on a single physical media volume for use in the library of FIG. 1.

FIG. 3 is a schematic representation of a physical media volume 50 such as a magnetic tape in one of the cartridges 14. Each cartridge contains in logical volumes 52–56 in one configuration, a single physical volume can include up to 140 logical volumes each of which can be individually addressed and accessed. In another configuration, a single physical media volume 50 can include a variable number of logical volumes of variable size, again each of which can be individually addressed and accessed.

The key identifier for both logical volumes and physical volumes is the "volume serial number" or "volser". Each volser comprises a predetermined number of characters or blanks. Most physical volumes have the volser, or a similar identifier which is translatable to a volser, encoded in a label which is on the side of the cartridge and is readable by the accessor 18. Thus one physical volume 50 will have a volser as will the logical volumes 52–56. The host processor 30 maintains a system volume catalog of the volumes by the volser and includes other data relating to the volumes. Each logical volume appears as an addressable data storage volume to the host processor that is mountable in one of the drives 12 in the tape library 10.

The data base 38 includes a cartridge table that provides data regarding the status of all the volumes in the tape library 10 both logical and physical. One record of the cartridge table represents one volume. The first column in the table of the volser is described above. The cartridge table also includes the category of the volume. The host may assign volumes into logical groups called categories. Some common attributes for the logical groups include scratch volumes, expiration dates, common user, type of volume, host processor data related to a job or set of jobs, volumes to be transferred or migrated to a scratch category and so forth. Another section of the media table indicates whether the volser is a logical volume or a physical volume.

Referring again to FIG. 1, the tape library 10 provides import and export operations in order to move logical volumes out of the virtual tape server 32 to particular physical cartridges. These physical cartridges are called exported stacked volumes. The import and export operations return them to the same virtual tape server or move them to another virtual tape server. The lists of volumes for import or export operations are provided to the virtual tape server 32 on logical volumes called the import list volume or the export list volume. Both of these are resident in the virtual tape server 32. A status file on the export or import list volume provides status for each logical volume being processed.

The list of volumes for import or export are provided to the virtual tape server 32 on logical volumes called the export list volume or the import list volume both of which are resident in the virtual tape server. The import/export function of the virtual tape system includes requirements for the formats of the export and import list volumes. The format includes fields, records or files which are similar to both formats. An export list volume is a standard tape volume selected from the logical volumes in the virtual tape server 32. Three files are written to the volume. The first file contains logical volume-destination records and is called the export list file. The second file has a minimum of one record. The third file is the export status file and is initially written by the host without any data records. Upon the completion of an export operation, the virtual tape system will write status file records for each of the logical volumes listed in the export list file indicating the processing results.

An import list volume is a standard tape volume which is selected from the logical volumes. Two files are written to this volume. The first file contains records specifying the exported stacked volume and logical volume pairs to import or to import all logical volumes on an exported stacked volume. The second file is the import status file and is initially written by the host without any data records. Upon the completion of the import operation, the virtual tape system will write status file records indicating the results for each of the logical files listed specifically and the logical volumes contained on an export stacked volume listed when all logical volumes were to be imported.

Once all the logical volumes of an exported stacked volume have been imported into the virtual tape server 32, the exported stacked volumes can be reused for any application or may be returned to a vault for storage. However, the exported stacked volumes remain in the imported category until operator action is taken.

The import operation allows logical volumes which are stored on physical exported stacked volumes to become logical volumes within a virtual tape server. A specific volume or all volumes may be imported from exported stacked volumes which have been entered into a library through the input/output station 40 and have been moved to the import category by the library manager 24. The host 30 is provided the status on the progress and completion of the import operation via the import list volume.

The export operation allows customer data on logical volumes in the virtual tape server 32 to be removed and placed on physical exported stacked volumes. The list of volumes to export and a destination for each volume is provided by the host 30. Logical volumes with the same destination are grouped to the same exported stacked volume or volumes and these physical volumes are then moved into a category which allows an operator at the library manager 24 to eject the cartridge for storage outside the library or for movement to another tape library to be imported into another virtual tape server. Exported stacked volumes must never be identified as scratch volumes for this will cause the data on the volumes to be overwritten by other data. When the input/output station 40 of the tape library 10 is in an import mode, any potential import cartridge (exported stacked volumes) that is inserted into the input/output station 40 will be added to the unassigned category. Exported stacked volumes are cartridges that contain logical volumes that have been exported from the virtual tape server 32. In order to import logical volumes, those cartridges that are exported stacked volumes must be moved into the import category of the tape library 10 after having been input into the library. To use the input/output station 40 in the import mode, the cartridges must be placed in the input/output station 40. Exported stacked volumes in the unassigned category that will be used for an import operation must be moved into the import category. The library manager 24 permits the movement of physical volumes in the unassigned category to an import category, to an insert category, or to an eject category to eject the volumes. Also, the exported stacked volumes can be moved from the export hold category to the insert category or ejected from the library. The library manager 24 also permits a cancel request for an in process import or export operation. The library manager 24 also permits the movement of physical volumes in the import category to the insert category or to eject the volumes from the library. The library manager 24 permits the management of the export hold volume to move the exported stacked volumes in the export hold category to the import category. The export stacked volumes can also be ejected from the library. The library manager 24 can also cancel requests to the virtual tape server for an in progress import or export operation.

Figure 4:
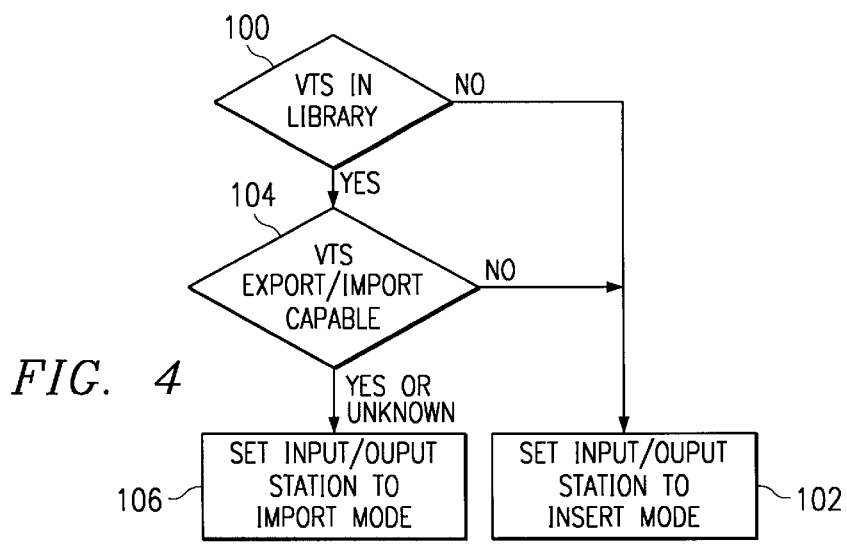
FIGS. 4, 5 and 6 are flowcharts showing a sequence of steps to manage a virtual cartridge data storage library in accordance with the invention.
Figures 5, 6:
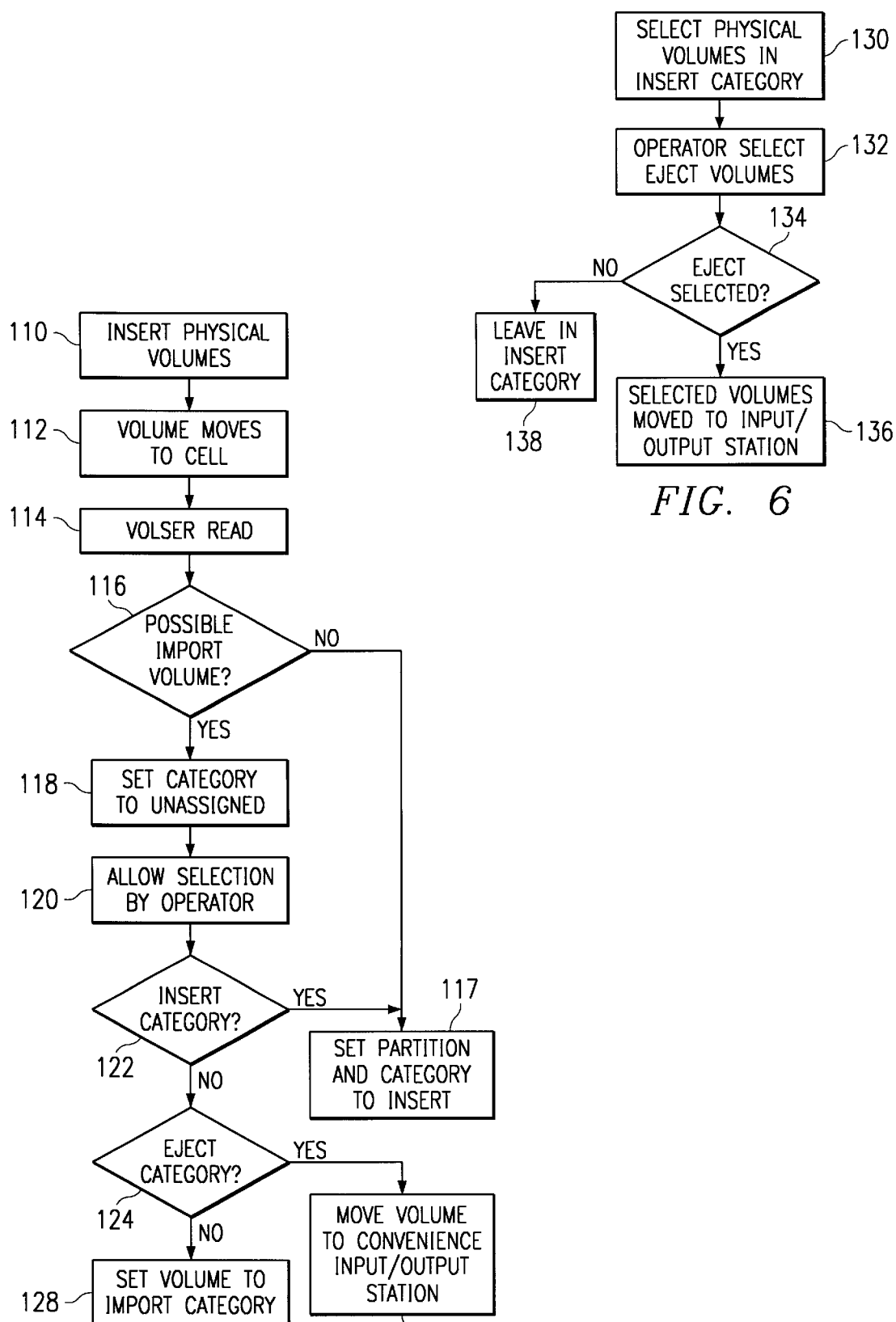

FIGS. 4, 5 and 6 are flow charts of a preferred embodiment. In FIG. 4, the determination of the export/import capability of the library 10 is shown. A decision block 100 determines whether there are any virtual tape servers (VTS) in the library system 10. If not, the flow continues to a block 102 to set the input/output station 40 in the standard existing system to an insert mode. If there is a virtual tape server, such as VTS 32 in the tape library 10, the block continues from the block 100 along the YES mode to a decision block 104 where there is a determination of whether the VTS 32 is export/import capable. If not, the flow continues back to the block 102 to set the input/output mode to insert. If the determination in the block 104 is that the export/import capability is UNKNOWN or is YES, the input/output station mode is set to the import mode, as shown in block 106.

Referring now to FIG. 5, the first block 110 shows that the operator inserts a physical volume into the convenience input/output station 40. The accessor 18 moves the cartridge to a position in the cells 16 as shown in a block 112. The vision system in the accessor 18 reads the volser information from the cartridge and determines the media type as shown in block 114. The next determination is whether the cartridge is a possible import media type as shown in a decision block 116. If the cartridge is not a possible import media type, the NO line is taken to set the cartridge to the insert category and to the partition defined in the volser range tables as shown in a block 117. If the cartridge is a possible import media type, the flow continues along the YES line out of the block 116 to place the cartridge in an unassigned category as shown in a block 118.

The flow continues in FIG. 5 to a block 120 where a display panel allows an operator to select to move the "unassigned" volumes to an import, insert or eject category. If the operator selects the volume as an insert category, the YES line is taken from a decision block 122 to set the cartridge to the insert category and to the partition defined in the volser range table as shown in block 117. If this volume is not selected for the insert category, the NO line is taken from the insert decision block 122 to a decision block 124 where the operator selects whether the volume is to be put into the eject category. If the volume is selected for an eject category, the volume is moved by the accessor 18 to the convenience input/output station 40, as shown in a block 126 along the YES line from the decision block 124. If the operator does not select this volume for the eject category, the NO line from decision block 124 shows that the volume is set to the import category. The library manager will display the unassigned category as determined by the flow chart of FIG. 5. The host 30 then can proceed with a normal operation for importing logical volumes. There is a possibility that the operator mistakenly places an import volume into the insert category. The operator can correct the mistake as shown in the flow chart of FIG. 6.

In FIG. 6, a block 130 shows that a panel displays all of the volumes that were placed into the insert category. The operator can then select the volumes that should be ejected from the insert list as shown in a block 132. A decision block 134 shows that the volumes selected by the operator for ejection are moved by the accessor 18 to the convenience input/output station 40, see a block 136. The volumes not selected for ejection are left in the insert category as shown in a block 138.

Using the foregoing specification, the invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hard-wired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the invention has been described with respect to a preferred embodiment as shown herein, it will be understood by those skilled in the art that various changes in detail may be made without departing from the spirit, scope, and teaching of the invention. Accordingly, the invention disclosed is to be limited only as specified in the following claims.

We claim:

1. A method for protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, the method conducted in response to a command for determining the import/export designation of logical volumes in the automated virtual storage section, the method comprising the steps of:

determining whether the library includes a virtual tape system;

determining whether the virtual tape system is capable of handling export/import volumes;

setting the input/output station to the insert mode and ending the method steps if there is no virtual tape system in the library or the virtual tape system is not export/import capable;

setting the input/output station to an import mode if the virtual tape system is in the library and is export/import capable or the virtual tape system capability is unknown;

inserting a physical volume into the input/output station;

moving said physical volume to a library cell;

reading a label from the physical volume;

determining whether the physical volume is a possible import volume;

placing the physical volume into an unassigned category if it is determined to be a possible import volume; and setting the unassigned category physical volume to an import category if not selected for the insert category or for ejection from the library.

2. A method for protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, the method conducted in response to a command for determining the import/export designation of logical volumes in the automated virtual storage section, the method comprising the steps of:

inserting a physical volume into the input/output station;

moving said physical volume to a library cell;

reading a label from the physical volume;

determining whether the physical volume is a possible import volume;

placing the physical volume into an unassigned category if it is determined to be a possible import volume; and setting the unassigned category physical volume to an import category if not selected in a selection step for the insert category or for ejection from the library.

3. The method of claim 2 wherein said selecting step is performed by an operator.

4. The method of claim 2 wherein said selecting step includes the steps of determining if said unassigned category physical volume is sent to the insert category and setting the category and partition in the volser range table to insert said unassigned category physical volume into the library.

5. The method of claim 2 wherein said setting step includes the steps of:

determining if said unassigned category physical volume is to be ejected;

moving said unassigned category physical volume into the input/output station if said volume is to be ejected; and removing said unassigned category physical volume from the library.

6. A method for protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, the method conducted in response to a command for determining the import/export designation of logical volumes in the automated virtual storage section, the method comprising the steps of:

inserting a physical volume into the input/output station;

moving said physical volume to a library cell;

reading a label from the physical volume;

determining whether the physical volume is a possible import volume;

placing the physical volume into an unassigned category if it is determined to be a possible import volume;

setting the unassigned category physical volume to an import category if not selected for insert or ejection from the library; and repeating the steps of inserting, moving, reading, determining, placing, and setting for a plurality of physical volumes.

7. The method of claim 6 wherein said setting step is performed by an operator.

8. The method of claim 7 further including the steps of:

selecting all of the physical volumes in the insert category;

reviewing all of the physical volumes in the insert category for erroneously determined insert category volumes;

determining if said insert category physical volumes are to be ejected;

moving said insert category physical volume into the input/output station if said volume is to be ejected; and leaving said physical volume in the insert category if the volume is not to be ejected.

9. A method for protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, the method conducted in response to a command for determining the import/export designation of logical volumes in the automated virtual storage section, the method comprising the steps of:

determining whether the library includes a virtual tape system;

determining whether the virtual tape system is capable of handling export/import volumes;

setting the input/output station to the insert mode and ending the method steps if there is no virtual tape system in the library or the virtual tape system is not export/import capable;

setting the input/output station to an import mode if the virtual tape system is in the library and is export/import capable or the virtual tape system capability unknown;

inserting a physical volume into the input/output station;

moving said physical volume to a library cell;

reading a label from the physical volume;

determining whether the physical volume is a possible import volume;

placing the physical volume into an unassigned category if it is determined to be a possible import volume;

selecting the unassigned category physical volume to an import category if not selected for insert into or ejection from the library;

wherein said selecting step includes the steps of:

determining if said unassigned category physical volume is to be inserted;

setting the category and partition determined from the volser range table to insert said unassigned category physical volume into the library;

determining if said unassigned category physical volume is to be ejected;

moving said unassigned category physical volume into the input/output station if said volume is to be ejected; and removing said unassigned category physical volume from the library.

10. An article of manufacture for use in protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, said article of manufacture activated in response to a command for determining the import/export designation of logical volumes in the automated virtual storage section, said article of manufacture comprising a computer-readable storage medium tangibly embodying a program of executable computer instructions which may cause said cartridge retrieval library to:

determine whether the library includes a virtual tape system;

determine whether the virtual tape system is capable of handling export/import volumes;

set the input/output station to the insert mode and end if there is no virtual tape system in the library or the virtual tape system is not export/import capable;

set the input/output station to an import mode if the virtual tape system is in the library and is export/import capable or the virtual tape system capability is unknown;

insert a physical volume into the input/output station;

move said physical volume to a library cell;

read a label from the physical volume;

determine whether the physical volume is a possible import volume;

place the physical volume into an unassigned category if it is a possible import volume; and set the unassigned category physical volume to an import category if not selected for the insert category or for ejection from the library.

11. An article of manufacture for use in protection data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, said article of manufacture conducted in response to a command for determining the import/export designation of logical volumes in the automated virtual storage section;

said article of manufacture comprising a computer-readable storage medium embodying a program of executable computer instructions which may cause said library, in response to a command for determining the import/export designation of logical volumes in the automated virtual storage section as a result of inserting a physical volume into the input/output station, to:

insert a physical volume into the input/output station;

move said physical volume to a library cell;

read a label from the physical volume;

determine whether the physical volume is a possible import volume;

place the physical volume into an unassigned category if it is determined to be a possible import volume; and set the unassigned category physical volume to an import category if not selected in a selecting step for the insert category or for ejection from the library.

12. The article of manufacture in claim 11 wherein said program of executable computer instructions may further cause said library, in said selecting step to determine if said unassigned category physical volume is sent to the insert category; and set the category and partition in the volser range table to insert said unassigned category physical volume into the library.

13. The article of manufacture in claim 11 wherein said program of executable computer instructions may further cause said library, in the set of the unassigned category physical to an import category to:
   determine if said unassigned category physical volume is to be ejected;
   move said unassigned category into the input/output station if said volume is to be ejected; and
   remove said unassigned category physical volume from the library.

14. An article of manufacture for use in protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and a connection to a host computer, said article of manufacture activated in response to a command for determining the import/export designation of logical volumes in the automated virtual storage section,
   said article of manufacture comprising a computer-readable storage medium tangibly embodying a program of executable computer instructions which may cause said cartridge retrieval library to:
   insert a physical volume into the input/output station;
   move said physical volume to a library cell;
   read a label from the physical volume;
   determine whether the physical volume is a possible import volume;
   place the physical volume into an unassigned category if it is determined to be a possible import volume;
   set the unassigned category physical volume to an import category if not selected for insert or ejection from the library; and
   repeating the insert, move, read, determine, place, and set operations for a plurality of physical volumes.

15. The article of manufacture of claim 14 wherein said program of executable computer instructions may further cause said library to further:
   select all of the physical volumes in the insert category;
   review all of the physical volumes in the insert category for erroneously determined eject category volumes;
   determine if said insert category physical volumes are to be ejected category;
   move said insert category physical volume into the input/output station if said volume is to be ejected; and
   leave said unassigned category physical volume in the insert category if the volume is not to be ejected.

16. An article of manufacture for use in protecting data in logical volumes in an automated virtual storage section of a cartridge retrieval library containing physical media volumes of data, the library having a library manager with a data base program, a plurality of library cells for storing said physical media volumes, each physical media volume having from none to a plurality of said logical volumes located thereon, at least one drive unit, at least one accessor for accessing said library cells and reading labels of said physical media volumes and for transporting said physical media volumes between said drive unit and said cells, a stored table of existing logical volume records and of existing physical volume records, and an interface to a host computer, said article of manufacture activated in response to a command for determining the import/export designation of logical volumes in the automated virtual storage section, said article of manufacture comprising a computer-readable storage medium tangibly embodying a program of executable computer instructions which may cause said cartridge retrieval library to:
   determine whether the library includes a virtual tape system;
   determine whether the virtual tape system is capable of handling export/import volumes;
   set the input/output station to the insert mode and end the execution of said article of manufacture if there is no virtual tape system in the library or the virtual tape system is not export/import capable;
   set the input/output station to an import mode if the virtual tape system is in the library and is export/import capable;
   insert a physical volume into the input/output station;
   read a label from the physical volume;
   move said physical volume to a library cell;
   determine whether the physical volume is an import volume;
   place the physical volume into an unassigned category if it is determined to be an import volume; and
   select the unassigned category physical volume to an import category if not selected for insert into or ejection from the input/output station;
   wherein the execution of said article of manufacture to select the unassigned category physical further causes said library to:
   determine if said unassigned category physical volume is in an insert category;
   set the partition in the volser table to insert said unassigned category physical volume into the library;
   determine if said unassigned category physical volume is in an eject category;
   move said unassigned category physical volume into the input/output station if said volume is in the eject category; and
   remove said unassigned category physical volume from the library.

* * * * *